United States Patent [19]

Castonguay et al.

[11] 4,301,433
[45] Nov. 17, 1981

[54] CIRCUIT BREAKER ELECTRICAL CLOSURE CONTROL APPARATUS

[75] Inventors: Roger N. Castonguay, Terryville; Charles L. Jencks, Avon, both of Conn.

[73] Assignee: General Electric Company, New York, N.Y.

[21] Appl. No.: 162,278

[22] Filed: Jun. 23, 1980

[51] Int. Cl.³ .................... H01H 73/02; H01H 75/02
[52] U.S. Cl. ........................................ 335/13; 335/17; 335/172
[58] Field of Search ............... 335/13, 157, 26, 27, 335/28, 20, 166, 167, 168, 169, 170, 171, 172, 173, 174, 175; 200/308, 320, 153 SC, 153 G, 153 H

[56] References Cited

U.S. PATENT DOCUMENTS 4,166,989  9/1979  Castonguay et al. ............... 335/13
4,211,989  7/1980  Acampora ............................ 200/308
4,251,702  2/1981  Castonguay et al. ............. 200/153 SC Primary Examiner—Harold Broome
Attorney, Agent, or Firm—Richard A. Menelly; Walter C. Bernkopf; Philip L. Schlamp

[57] ABSTRACT

A normally open close switch and a normally open arming switch are connected in series with a closing solenoid operatively coupled with hook apparatus for releaseably holding breaker movable contacts in a hooked open position against the closing force of a charged breaker operating mechanism. An arm actuates the arming switch in response to the movable contacts assuming their hooked open position, such that subsequent actuation of the close switch effects closing solenoid activation of the hook apparatus to release the movable contacts from their hooked open position. A holding solenoid, wired in shunt with the arming switch, prevents the arm from reactuating the arming switch in the event of sustained actuation of the close switch.

10 Claims, 14 Drawing Figures

CIRCUIT BREAKER ELECTRICAL CLOSURE CONTROL APPARATUS

REFERENCE TO RELATED APPLICATIONS

The instant application is related to the commonly assigned, concurrently filed patent applications entitled Circuit Breaker Trip Latch Assembly (Ser. No. 162,281), Flux Shifter Reset Assembly (Ser. No. 162,280), Undervoltage Release Reset and Lockout Apparatus (Ser. No. 162,271), Circuit Breaker Condition Indicator Apparatus (Ser. No. 162,282) and Circuit Breaker Hook Apparatus (Ser. No. 162,279).

BACKGROUND OF THE INVENTION

The present invention relates to industrial circuit breakers and particularly to apparatus for controlling closing solenoid initiated closure thereof.

The subject closure control apparatus has particular, but not necessarily limited application to stored energy reclosure type circuit breakers, such as that disclosed in commonly assigned, copending application, Ser. No. 52,276, filed June 25, 1979, now Pat. No. 4,251,702. The disclosure of this copending application is specifically incorporated herein by reference. As therein disclosed, a circuit breaker is equipped with a separate charging mechanism which is charged and then discharged to charge a spring-powered operating mechanism capable, when charged, to propel breaker movable contacts from a tripped open position to a closed position and, when discharged or tripped, from their closed position to their tripped open position. The charging mechanism also has the capability of being sustained in its charged condition while the operating mechanism is charged so as to be prepared to abruptly recharge the operating mechanism immediately after it has been discharged. Thus, the circuit breaker can be closed, tripped open, and immediately reclosed. To control closure of the circuit breaker, a hook is incorporated to releaseably hold the movable contacts in an intermediate hooked open position against the closing force of a charged operating mechanism. To accommodate breaker closure from a remote location, a closing solenoid is utilized to articulate the hook pursuant to releasing the movable contacts from their hooked open position. Should the breaker close in on a fault and immediately trip open, and if a charge is stored in the charging mechanism, the operating mechanism is immediately recharged. If the closing solenoid is again electrically energized due to inadvertently sustained closure of a remote close switch, the hook is held removed and, with recharging of the operating mechanism, the movable contacts will close back in on the fault. This is a hazardous situation which must be avoided.

In accordance with the present invention, there is provided improved electrical closure control apparatus for reclosure type industrial circuit breakers.

A further object is to provide electrical closure control apparatus capable of preventing unintended closure of a breaker back in on a fault from which it has just been tripped open.

An additional object is to provide electrical closure control apparatus of the above character which readily accommodates externally imposed interlocking to prevent electrical closure of the circuit breaker.

Another object is to provide electrical closure control apparatus of the above character which is efficient in construction and reliable in operation.

Other objects of the invention will in part be obvious and in part appear hereinafter.

SUMMARY OF THE INVENTION

In accordance with the present invention, there is provided electrical closure apparatus for controlling contact closure of a reclosure type circuit breaker. The apparatus includes a normally open close switch and a normally open arming switch connected in a series energization circuit for a closing solenoid operatively coupled with hook apparatus releaseably holding the breaker movable contacts in a hooked open position against the closing force of a charged breaker operating mechanism. A switch actuating arm is positioned in actuating engagement with the arming switch in response to the movable contacts assuming their hooked open position. Consequently, closure of the close switch completes the energization circuit for the closing solenoid, which is then actuated to articulate the hook apparatus into releasing the movable contacts from their hooked open position.

To prevent unintended reclosure of the breaker into a fault from which it has just been tripped open, a holding solenoid is wired in shunt with the arming switch. The plunger of this holding solenoid is controllably coupled with the switch actuating arm such as to hold it out of reactuating engagement with the arming switch if energization of the holding solenoid is not interrupted by the opening of the close switch by the time the movable contacts arrive at their hooked open position. Under these circumstances, the arming switch is not closed to complete the closing solenoid energization circuit, leaving the hook apparatus in a condition to intercept and hold the movable contacts in their hooked open position. Thus, reclosure of the breaker into a fault from which it has just been tripped by virtue of inadvertent, sustained closure of the remote close switch is precluded.

As an additional feature of the present invention, a closure defeat lever is included to engageably hold the switch actuating arm out of actuating engagement with the arming switch in response to an external imposed interlock function. Since the establishment of an effective energizing circuit for the closing solenoid is precluded by the deactuated condition of the arming switch, the capability of the close switch to precipitate release of the movable contacts from their hooked open position is defeated.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings in which:

DESCRIPTION OF THE DRAWINGS

Corresponding reference numerals refer to like parts throughout the several views of the drawings.

DETAILED DESCRIPTION

Figure 1:
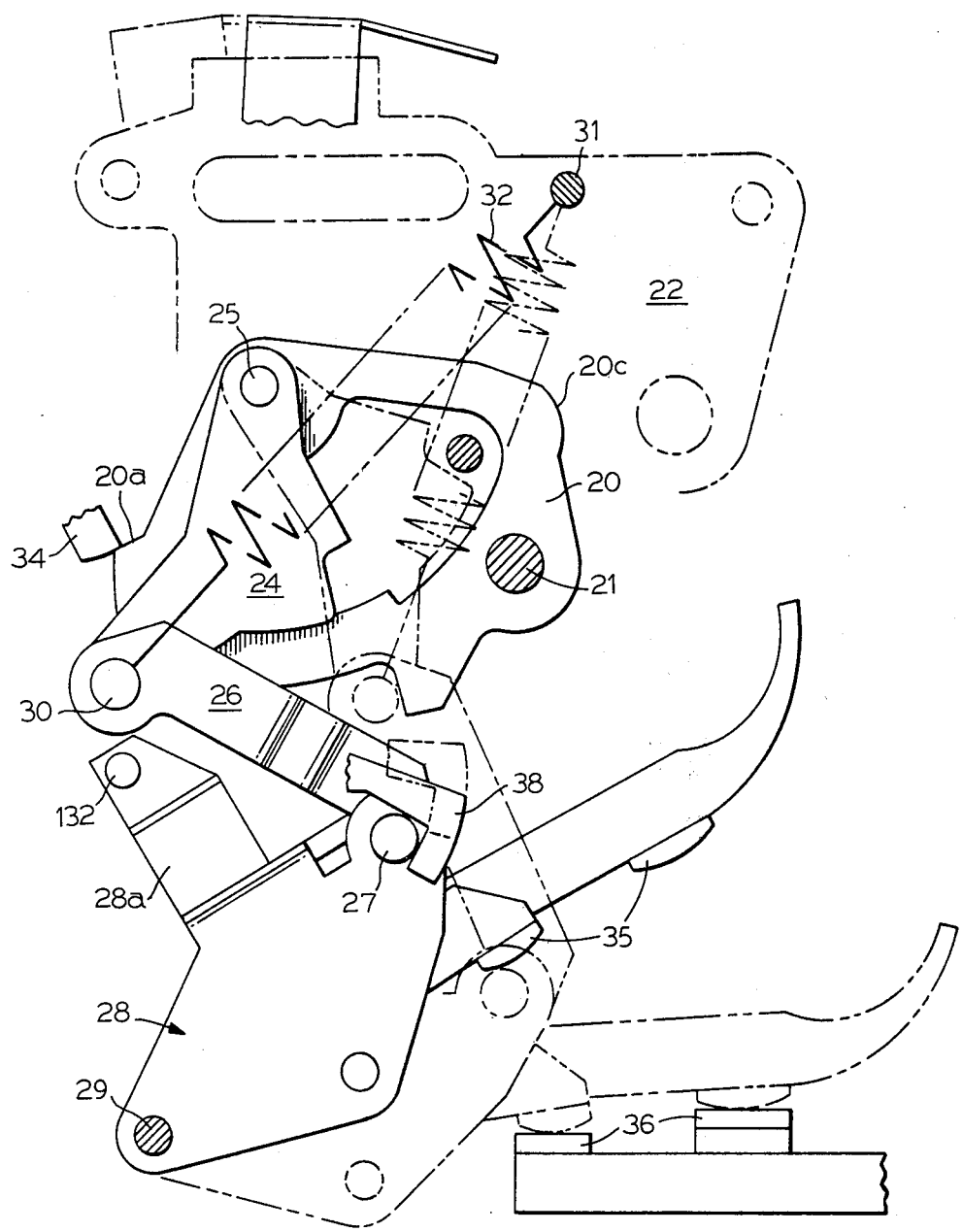
FIG. 1 is a side elevational view of a circuit breaker spring-powered movable contact operating mechanism.

Turning to the drawings, there is shown in FIG. 1, a circuit breaker movable contact operating mechanism corresponding to that disclosed in the abovenoted copending application, Ser. No. 52,276. Thus, a cradle 20 is fixedly mounted on a pin 21 journalled by opposed mechanism frame sideplates 22. A toggle linkage consisting of an upper link 24 and a lower link 26 connects cradle 20 to a center pole movable contact assembly 28, pivotally mounted at 29. Specifically, the upper end of link 24 is pivotally connected to the cradle by a pin 25, while the lower end of link 26 is pivotally connected to the center pole movable contact assembly by a pin 27. The other ends of these toggle links are pivotally interconnected by a knee pin 30. Mechanism tension springs 32 act between the toggle knee pin and a stationary pin 31 supported between the frame sideplates 22.

From the description thus far, it will be noted that, by virtue of the position of spring anchoring pin 31, the line of action of the mechanism springs, while in their charged state by virtue of cradle 20 being in its latched reset position sustained by the engagement of a latch 34 with cradle latch shoulder 20a, is always situated to the right of the upper toggle link pivot pin 25. Thus, the mechanism springs continuously act to straighten the toggle. Since straightening of the toggle forces the movable contact assemblies 28, ganged together by crossbar 28a, to pivot downwardly to their phantom line, closed circuit position with their movable contacts 35 engaging stationary contacts 36, the circuit breaker is always biased toward contact closure while cradle 20 is latched in its reset position.

To control the moment of contact closure, a hook 38 engages pin 27 to hold movable contact assemblies 28 in a hooked open circuit position while the cradle is latched in its reset position and while it is being returned to its latched, reset position from a clockwise-most tripped position to charge the mechanism springs. Thus the toggle is maintained collapsed to the left as seen in FIG. 1. When the hook is removed, the movable contact assemblies 28 are pivoted to their closed circuit positions as springs 32 act to abruptly straighten toggle links 24, 26.

Figure 2:
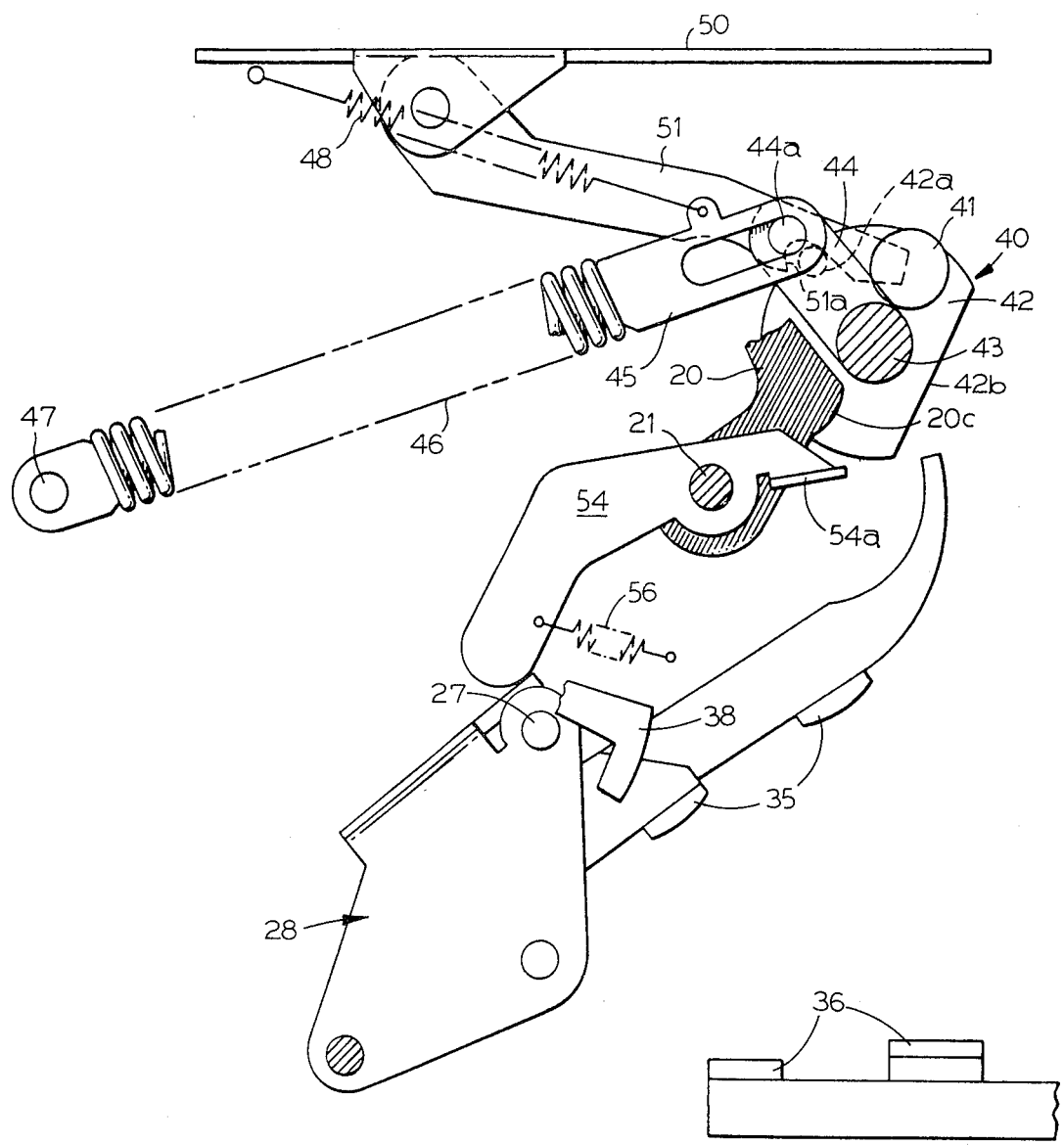
FIG. 2 is a simplified, side elevational view of a spring-powered charging mechanism utilized to charge the movable contact operating mechanism of FIG. 1.
Figure 3:
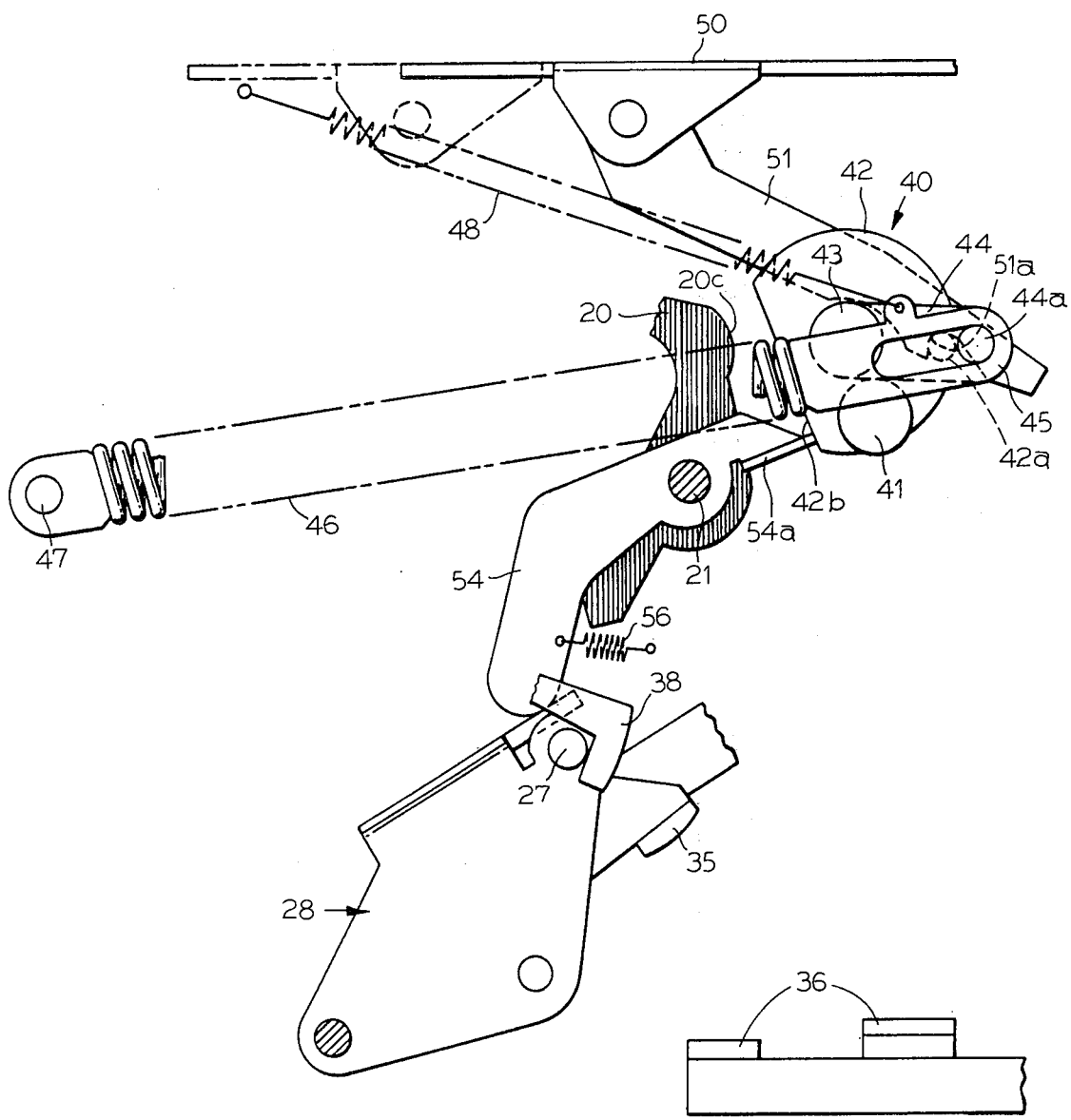
FIG. 3 is a simplified, side elevational view of the charging mechanism of FIG. 2 in its condition with a charge stored therein and while a charge is stored in the movable contact operating mechanism.
Figure 4:
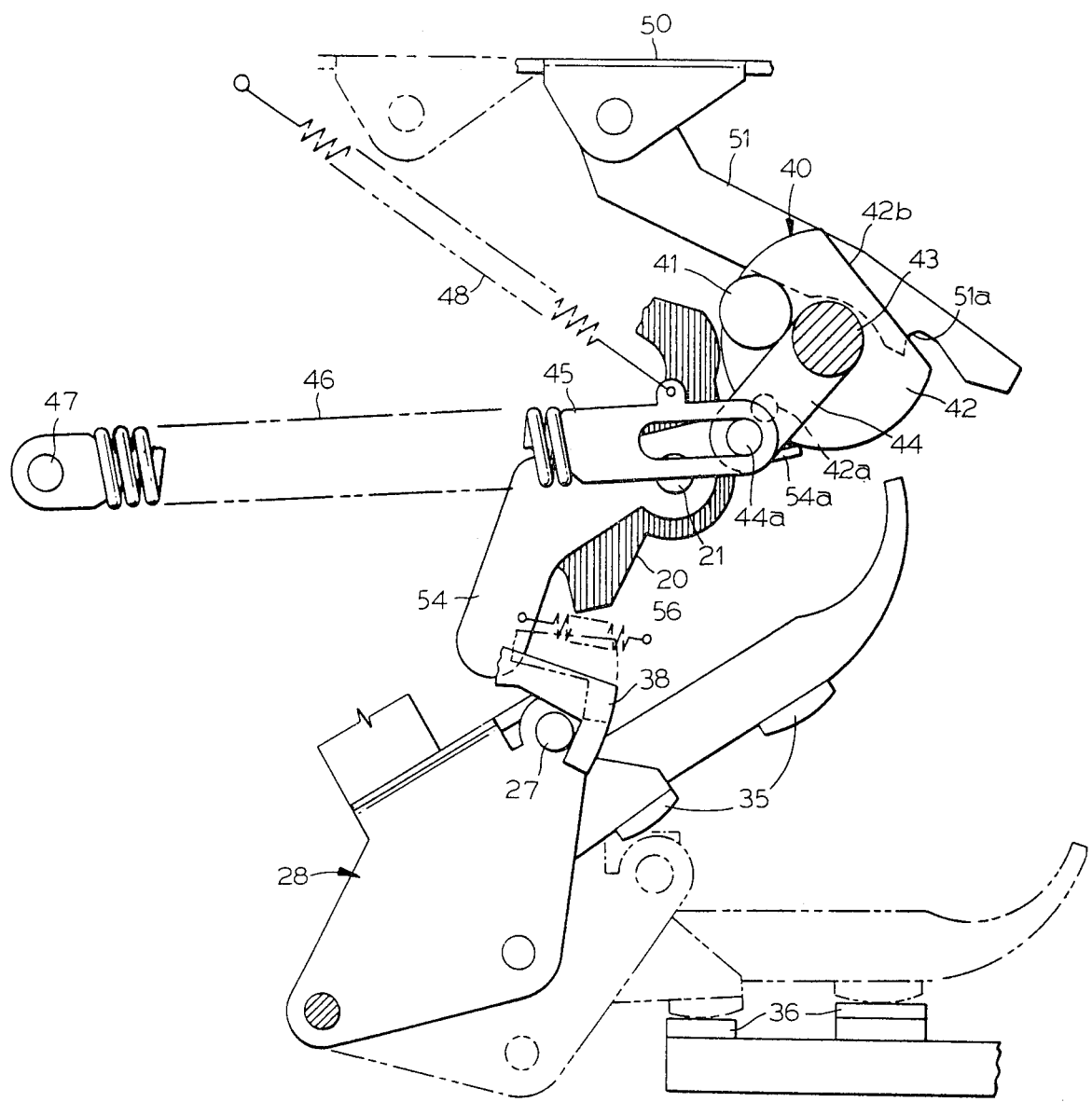
FIG. 4 is a simplified, side elevational view of the charging mechanism seen in its discharged condition while a charge is stored in the movable contact operating mechanism.

Reference is now had to FIGS. 2 through 4 for a review of the overall operation of the circuit breaker disclosed in the above-noted application, Ser. No. 52,276, and specifically the operation of a separate charging mechanism in charging the mechanism springs of the movable contact operating mechanism of FIG. 1. To induce counterclockwise resetting pivotal movement of cradle 20, a bell crank assembly, generally indicated at 40, is provided with a reset roller 41 eccentrically mounted by a bell crank arm 42 carried by a shaft 43 journalled by the frame sideplates. Keyed to this shaft is an arm 44 which carries at its free end a pin 44a operating in an elongated slot in a spring anchor 45 secured to one end of a powerful tension spring 46. The other end of this spring is anchored to a stationary pin 47. As will be seen, when charging spring 46 discharges, bell crank assembly 40 is rotated clockwise to swing the reset roller around to engage a nose 20c of cradle 20, while in its tripped position, thereby driving the cradle in the counterclockwise direction to its latched reset position, in the process charging the contact operating mechanism springs 32 (FIG. 1).

Referring first to FIG. 2, bell crank assembly 40 is seen in its start angular orientation achieved by the action of a tension spring 48. An operator slide 50 is shown in its left-most return position with a pawl 51, pivotally connected thereto, retracted to a position where notch 51a in its free end is in intercepting relation with an eccentric pin 42a carried by crank arm 42. From FIG. 3 it is seen that when slide 50 is propelled to the right through a breaker operating mechanism charging stroke, drive pawl 51 is pushed to the right. Its notch 51a picks up pin 42a, causing bell crank assembly 40 to be rotated in the clockwise direction. When the bell crank assembly reaches its angular position of FIG. 3, it is seen that charging spring 46 is stretched to a charged state. It is assumed, at this point in the description, that the movable contact operating mechanism of FIG. 1 is tripped, and thus cradle 20 is in its clockwise-most tripped position seen in FIG. 2. Under these circumstances, the essentially discharged contact operating mechanism springs 32 have lifted movable contact assemblies 28, to a counterclockwise-most tripped open position also seen in FIG. 2. In this position, the top surface of the center pole movable contact assembly engages and lifts the left lower end of a prop 54 pivotally mounted intermediate its ends by cradle pin 21. The upper end 54a of this prop is moved downwardly out of engaging relation with the arcuate surface portion of the bell crank arm against which it is normally engaged under the bias of a return spring 56.

As seen in FIG. 3, the rightward charging stroke of operator slide 50 is sufficient to carry the line of action of charging spring 46 through the axis of the bell crank assembly shaft 43. Consequently, with prop 54 in its FIG. 2 position, the charging spring immediately discharges and the bell crank assembly is thereby driven in the clockwise direction, swinging reset roller 41 into engagement with nose 20c of cradle 20 in its tripped position of FIG. 2. The cradle is thus swung in the counterclockwise direction to its reset position as the discharging springs 46 drive the bell crank assembly to its angular position seen in FIG. 4. As cradle 20 is being reset, contact operating mechanism springs 32 are charged to exert a bias tending to drive the movable contact assemblies 28 to their closed circuit positions seen in phantom in FIGS. 1 and 4. However, hook 38 is in position to intercept pin 27 and detain the movable contact assemblies in their hooked open position seen in FIGS. 3 and 4. By virtue of the loss motion coupling between bell crank assembly 40 and charging spring 46 afforded by the slot in spring anchor 45, spring 48 acts to continue the clockwise rotation of the bell crank assembly from its angular position of FIG. 4 around to its start position of FIG. 2 with pin 44a again bottomed against the right end of the spring anchor slot.

From the description thus far, it is seen that the first charge-discharge cycle of charging spring 46 has been effective in returning the contact operating mechanism cradle 20 to its latched reset position and charge springs 32 thereof, but the breaker contacts are sustained in their hooked open circuit position by hook 38. At this point, the operator slide 50 can be motivated through a second rightward charging stroke to again charge spring 46. Since movable contact assemblies 28, in their hooked open position, have released prop 54, its upper end 54a rides on the arcuate surface portion of bell crank arm 42 as the bell crank assembly is rotated in a clockwise direction. Spring 56 elevates prop end 54a into intercepting relation with a flattened surface 42b of bell crank arm 42 at the conclusion of the operator slide charging stroke just as the line of action of the charging spring 46 passes below the axis of bell crank assembly shaft 43. Thus, as seen in FIG. 3, prop 54 serves to prevent further clockwise rotation of bell crank assembly 40, and the charging spring 46 is held in a fully charged condition. It is thus seen that while the breaker contacts are held in their hooked open circuit position by hook 38, both the charging spring 46 and contact operating mechanism springs 32 are poised in their fully charged conditions. At this point, hook 38 may be articulated to release the movable contact assemblies 28, whereupon they pivot to their closed circuit position under the urgence of mechanism springs 32. It will be noted that closure of the movable contacts has no effect on prop 54, and thus charging spring 46 is sustained in its fully charged condition.

When the circuit breaker is eventually tripped open by removal of latch 34 (FIG. 1), the unlatched cradle 20 swings clockwise to its tripped position, and the movable contact assemblies abruptly pivot upwardly to their tripped open position of FIG. 2, all under the urgence of the discharging contact operating mechanism springs 32. As the center pole movable contact assembly moves to its tripped open position, it picks up the lower end of prop 54, ducking its upper end out of engagement with the flat peripheral surface 42b of crank arm 42. The clockwise rotational restraint on the bell crank assembly is thus removed, and charging spring 46 abruptly discharges, swinging reset roller 41 around to drive cradle 20 from its tripped position of FIG. 2 back to its reset position of FIG. 3. The contact operating mechanism springs 32 are again charged, and the movable contact assemblies 28 move to their hooked open position seen in FIG. 4. At this point, the charging spring 46 may again be charged to create the condition depicted in FIG. 3, and the charge therein will be automatically stored by prop 54 until needed to recharge the contact operating mechanism springs 32. Alternatively, and more significantly, hook 38 may be articulated to precipitate closure of the breaker, and thereafter the breaker may be tripped open without charging the charging spring 46.

From the foregoing description, it is seen that with the breaker contacts open and its contact operating mechanism tripped, the charging spring can be put through a first charge-discharge cycle to charge the contact operating mechanism springs 32 and then a second charge which is stored by prop 54 until needed to recharge the mechanism springs. Thus, the circuit breaker, starting in its tripped open condition and with two chargings of charging spring 46, can be, in sequence, closed, tripped open, reclosed and tripped open again without an intervening charging of the charging spring. It follows from this that the charging spring can be charged with the breaker contacts closed to achieve, in sequence, opening, closing and opening operations of the circuit breaker without an intervening charge.

Figure 5:
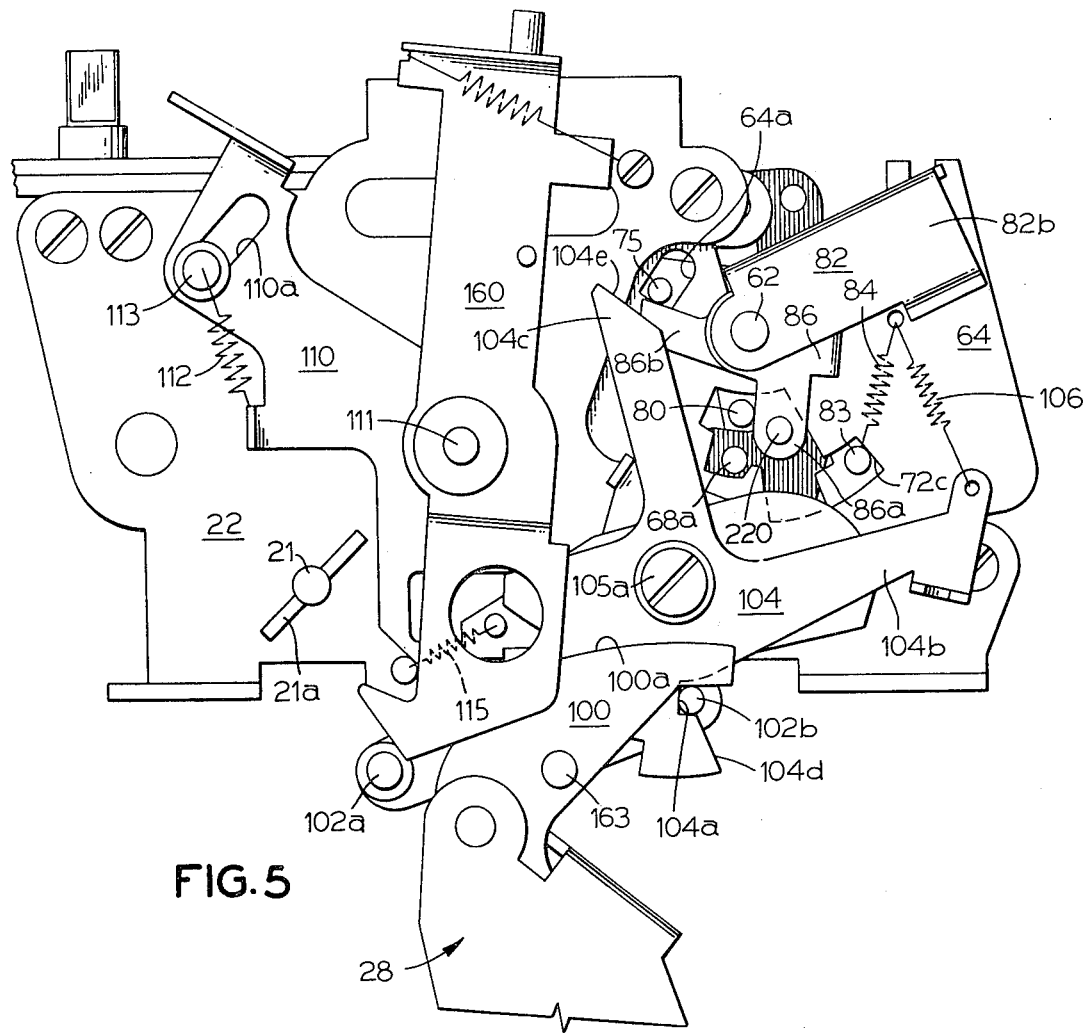
FIG. 5 is a side elevational view of an industrial circuit breaker showing releaseable hook apparatus for holding the breaker movable contacts in their hooked open position of FIG. 3.
Figure 6:
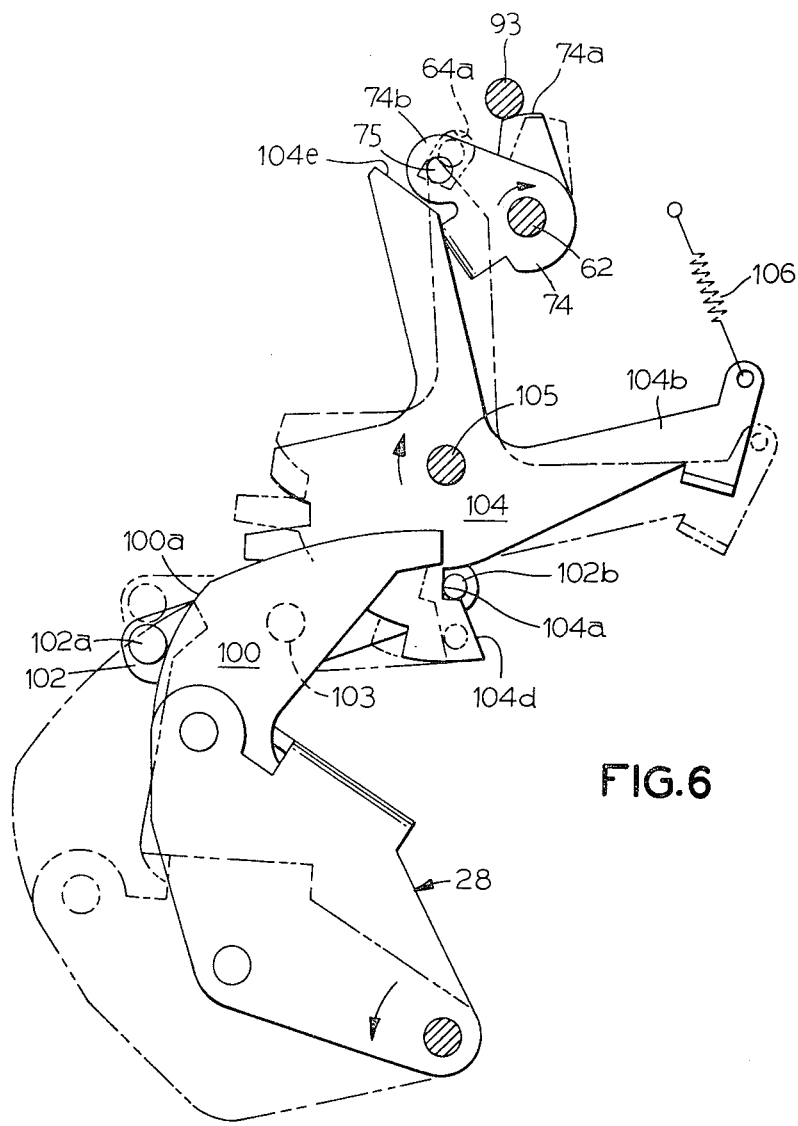
FIG. 6 is a simplified side elevational view of the hook apparatus of FIG. 5, illustrating its release of the breaker movable contacts from their hooked open position.

To contend with the high impact forces incident with stopping the movable contact assemblies 28 in their hooked open position of FIG. 1 as they spring from their tripped open position of FIG. 2 toward their closed circuit position while mechanism springs 32 are charged, a more elaborate hook arrangement than the simple hook 38 was necessitated. To this end, as seen in FIGS. 5 and 6, a cam plate 100, presenting an elongated, compound arcuate cam edge 100a, is mounted by the center pole movable contact assembly. This cam edge engages a roller pin 102a carried at the left end of an intermediate hook lever 102 which is pivotally mounted intermediate its ends on a pin 103 mounted by one of the mechanism frame sideplates 22. The other end of this intermediate hook lever carries a latch pin 102b which is latchably received in a notch 104a provided in a primary hook lever 104 which is pivotally mounted by a hub 105 (FIG. 6); this pivotal mounting being preserved by a screw 105a (FIG. 5). This primary hook lever includes a generally horizontally extending actuating arm 104b and an upstanding actuating finger 104c. A tension spring 106 biases the primary hook lever to a counterclockwise-most latching position with latch pin 102b of the intermediate hook lever lodged in notch 104a.

FIG. 5 depicts the movable contact assemblies in their tripped open position assumed when mechanism springs 32 (FIG. 1) are completely discharged. Under these circumstances, cam edge 100a is disengaged from roller pin 102a of intermediate latch lever 102. When, during the return of cradle 20 from its tripped position by the discharge of charging spring 46 (FIG. 4) pursuant to charging mechanism springs 32, the line of action of the mechanism springs moves to the right of toggle pivot pin 26 (FIG. 1) and the mechanism springs become empowered to straighten the toggle. The movable contact assemblies are thus abruptly propelled from their tripped open position toward their closed circuit position. This closing movement is arrested at the hooked open position when cam edge 100a impacts with roller pin 102a of intermediate hook lever 102. Since latch pin 102b is lodged in primary hook notch 104a, the clockwise movement exerted on the intermediate hook lever by the charging mechanism springs is resisted, and the movable contact assemblies are readily arrested in their hooked open position, seen in solid line in FIG. 6, while the cradle is being re-latched in its reset position.

To now unhook the movable contact assemblies for closure under the urgence of the fully charged mechanism springs, primary hook 104 is simply pivoted from its latching position in the clockwise direction to its unlatching position seen in phantom line in FIG. 6. This pivotal movement, which may be induced by a closing solenoid (not shown) acting on primary hook actuating arm 104b, disengages latch pin 102b from notch 104a. The clockwise pivotal restraint on intermediate hook 102 is thus removed, thereby unhooking the movable contact assemblies for movement to their closed circuit position under the urgence of the charged mechanism springs 32. During this closure movement, cam 100 propels intermediate hook 102 through an increment of clockwise rotation to an unhooking position. In the process, latch pin 102b acts on a sloping edge 104d of primary hook 104 beneath notch 104a to propel the primary hook through an increment of clockwise pivotal movement in addition to and independent of the closure initiating action on the primary hook in initially dislodging latch pin 102b from notch 104a. During this additional increment of clockwise primary hook pivotal movement to an extreme unlatching position induced solely by the closing movement of the movable contact assemblies, the upper edge 104e of primary hook finger 104c picks up pin 75 carried by a secondary latch 74 of a trip latch assembly which is disclosed in detail in the above-noted related application entitled Circuit Breaker Trip Latch Assembly. This secondary latch is thus rotated in the clockwise direction seen in FIG. 6 to swing its prop 74a out from under an intermediate latch pin 93 of the trip latch assembly.

As is described in this related application, whose disclosure is specifically incorporated herein by reference, secondary latch 74 is pivoted from its latching position to its unlatching position incident with the closure of the breaker contacts so as to then qualify a second secondary latch to initiate removal of primary latch 34 from cradle shoulder 20a (FIG. 1) pursuant to tripping the breaker. It is seen that this action is achieved by primary hook 104 acting in response to closure movement of the movable contact assemblies communicated thereto by cam 100 and intermediate hook 102. Preferably, the geometry of primary hook 104 is such that secondary latch pin 75 is not picked up until latch pin 102b is irretrievably dislodged from notch 104a. Thus, secondary latch 74 cannot be removed by the externally induced pivotal movement of the primary hook to initiate unhooking of the movable contact assemblies, but only when the movable contact assemblies are committed to closure. This precludes so-called "crashing" of the breaker operating mechanism while the movable contact assemblies are in their hooked open position by the spurious removal of both secondary latches of the trip latch assembly.

While the movable contact assemblies remain in their closed circuit position, cam 100 maintains intermediate hook 102 and primary hook 104 in their phantom line positions of FIG. 6 and secondary latch 74 is thus held in its phantom line removed or unlatching position to sustain the qualification of the second secondary latch to initiate tripping of the breaker. When the breaker is tripped, the movable contact assemblies spring to their trip open position where cam 100 releases intermediate hook 102, as seen in FIG. 5. Spring 106 is then free to pivot primary hook 104 in the counterclockwise direction back to its latching position. In the process, edge 104d thereof, acting on latch pin 102b, cams intermediate hook 102 in the counterclockwise direction to a hooking position where the latch pin is re-engaged in notch 104a. At the same time, primary hook finger 104c is displaced from pin 75, freeing secondary latch 74 for return to its latching position to which it is spring biased, which is effective to reset the trip latch assembly, again as detailed in the related trip latch assembly application. From FIG. 2 it will be recalled that prop 54 is not removed to initiate recharging of the mechanism springs 32 (FIG. 1) until the movable contact assemblies substantially achieved their tripped open position. Consequently, the resettings of the trip latch and the primary and intermediate hooks are effected essentially before recharging of the mechanism springs begins.

Figure 9:
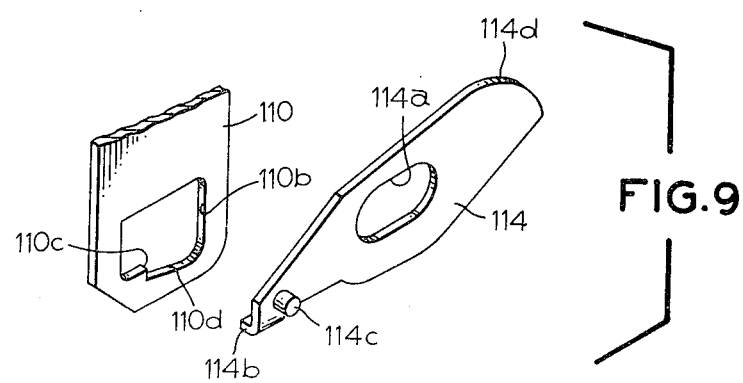
FIG. 9 is an exploded perspective view depicting the coupling relationship between a manual close lever and a bypass lever in the hook apparatus of FIG. 5.
Figure 7:
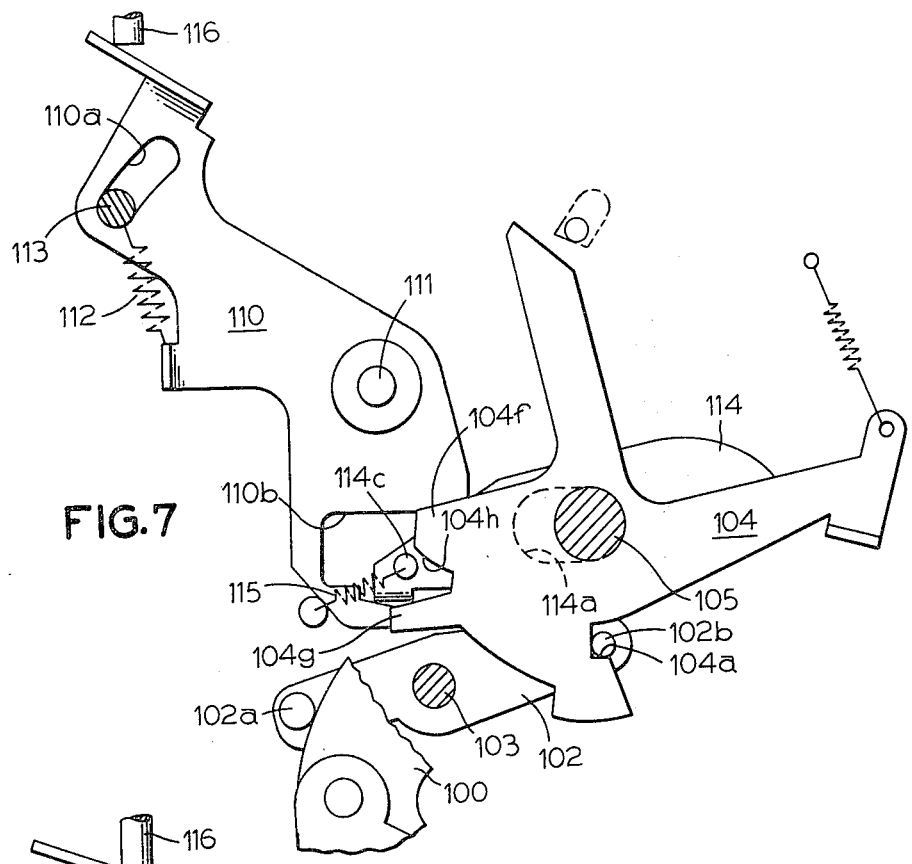
FIG. 7 is a side elevational view of the hook apparatus of FIG. 5 in its condition holding the movable contacts in their hooked open position.
Figure 8:
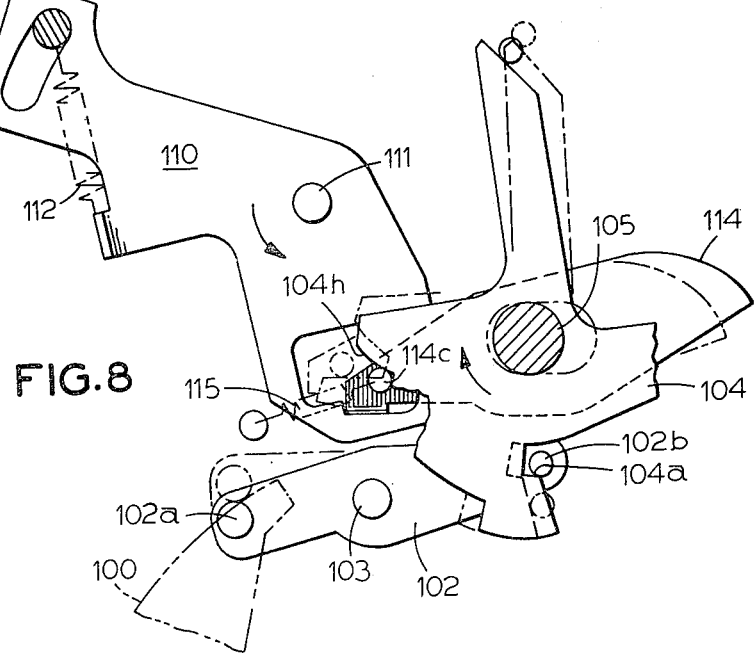
FIG. 8 is a side elevational view of the hook apparatus of FIG. 5 illustrating manually initiated release of the movable contacts from their hooked open position.

In addition to breaker closure being initiated by a closing solenoid acting on primary hook actuating arm 104b, breaker closure may also be initiated manually. To this end a close lever 110 is pivotally mounted to one of the mechanism frame sideplates by a pin 111, as seen in FIGS. 5, 7 and 8. A spring 112 biases this close lever to a clockwise-most quiescent position determined by the bottoming of a stationary pin 113 in a lever slot 110a. The lower end of close lever 110 is provided with a cutout 110b in which is created a shoulder 110c, as best seen in FIG. 9. An elongated bypass lever 114 is formed having an intermediate slot 114a in which is received hub 105, to both rotatably and slideably mount same, as seen in FIGS. 7 and 8. A tension spring 115 normally biases bypass lever 114 to a left-most position, seen in FIG. 7, determined by the bottoming of hub 105 against the right end of slot 114a. Spring 115 also normally biases the bypass lever to its counterclockwise-most position determined by the engagement of a laterally turned tab 114b thereof with an edge portion 110d of cutout 110b in close lever 110 (FIGS. 7 through 9).

The left end of primary hook 104, as best seen in FIG. 7, is provided with a protruding nose 104f and lip 104g. A pin 114c, carried at the left end of bypass lever 114, acts on the arcuate lower edge 104h of nose 104f to initiate unlatching, clockwise pivotal movement of primary hook 104 in response to counter-clockwise pivotal movement of close lever 110 induced by depression of a close pushbutton 116 provided in the breaker cover (not shown). Specifically, counterclockwise pivotal movement of the close lever swings its lower end rightward, and cutout shoulder 110c picks up tab 114b to shift bypass lever 114 rightward. Pin 114c thereof moves into engagement with arcuate edge 104h, camming the primary hook through an increment of clockwise rotation sufficient to dislodge latch pin 102b from notch 104a. The movable contact assemblies thus become unhooked and spring closed, incidentally pivoting intermediate hook 102 clockwise to impart an additional increment of clockwise rotation to the primary hook sufficient to remove secondary latch 74, all as previously described. Also incident with this additional increment of primary hook clockwise rotation, lip 104g swings upwardly to pick up pin 114c and lift the left end of bypass lever 114 sufficiently to elevate tab 114b above shoulder 110c in the close lever cutout 110b, as seen in phantom in FIG. 8. Spring 115 then acts to return the bypass lever to its left-most position.

Under these circumstances, it is seen that close lever 110 is decoupled from primary hook 104 in the sense that continued depression of close button 116 to sustain the close lever in its angular position of FIG. 8 can not prevent resetting of the primary and intermediate hooks when the breaker is tripped open and the movable contact operating mechanism then immediately recharged by the charging mechanism (FIGS. 3 and 4). Thus, if the breaker is closed by articulation of the close lever and is immediately tripped open because of a sensed fault condition, highly undesirable reclosure back into the fault if the operating mechanism is immediately recharged, is not permitted simply because depression of close pushbutton 116 is inadvertently continued. Since sustained close button depression does not prevent resetting of the primary and intermediate hooks, the movable contact assemblies are held in their hooked open position and thus can not close back in on the fault. To reset the bypass lever, the close pushbutton must be released to permit the close lever to return to its clockwise-most position under the bias of spring 112. This swings cutout shoulder 110c to the left of tab 114b, whereupon spring 115 swings the left end of the bypass lever downwardly to abut its tab against cutout edge 110d where it once again can be picked up by shoulder 110c. It is thus seen that, by virtue of bypass lever 114, a single depression of close pushbutton 116 can initiate but one breaker closure.

Bypass lever 114 is also utilized in conjunction with a trip lever 82, described in the above-mentioned related trip latch assembly application, to decouple close lever 110 from primary hook 104. As seen in FIG. 5, this trip lever is normally biased by a tension spring 84 to a counterclockwise-most position determined by the abutment of a pin 83 carried thereby with edge portion 72c of cutout 72 provided in sideplate 64. From FIG. 10, it is seen that clockwise pivotal movement of trip lever 82 induced, for example, by depression of a breaker cover mounted open pushbutton 121, causes a trip lever edge portion 82d to pick up pin 80 carried by the trip initiating secondary latch of the trip latch assembly pursuant to pivoting it to its trip precipitating unlatching position effecting removal of primary latch 34 (FIG. 1). In numerous applications, various forms of interlocking such as Kirk Key, breaker padlocking, drawout interlocking, are called for to prevent unauthorized manual closure of the circuit breaker. Typically, this is accomplished by defeating the cradle latch so that the breaker operating mechanism can not be charged. Since a discharged operating mechanism is incapable of closing the breaker movable contacts, effective interlocking is achieved. Since the trip latch assembly disclosed in the above-mentioned related application includes two secondary latches, each capable of sustaining a charge in the operating mechanism springs, both should be defeated to render the breaker incapable of being charged and subsequently closed by depression of the close pushbutton. However, this is not a desirable approach for the subject breaker construction since it is essential that trip lever 82 be completely divorced from secondary latch 74 so that the latter can be independently and quickly reset to hold the charge imparted to the mechanism springs by the charging springs immediately after the other secondary latch has been removed by the trip lever to trip the breaker open. Otherwise, prolonged depression of the OPEN pushbutton would cause the breaker operating mechanism to "crash" when the mechanism springs are recharged.

Figure 10:
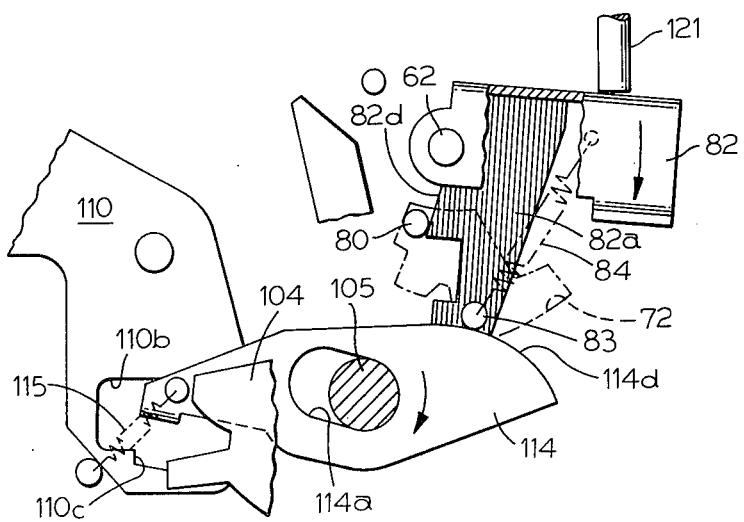
FIG. 10 is a fragmentary side elevational view illustrating the action of an externally applied interlock in defeating manual release of the movable contacts from their hooked open position.

Consequently, to accommodate such interlocking in the subject circuit breaker construction, trip lever 82 is held in its clockwise-most position seen in FIG. 10 by an external interlock actuating member (not shown) acting directly on the trip lever or on open pushbutton 121 to sustain its depression. The trip initiating secondary latch is thus held in its unlatching position. More significantly however, pin 83, carried at the lower end of trip lever leg 82a and projecting through frame sideplate cutout 72, is swung into engagement with an arcuate edge segment 114d of bypass lever 114. This causes the bypass lever to be rotated in the clockwise direction to lift and hold tab 114b in elevated, disengaged relation with cutout shoulder 110c of close lever 110. It is seen that, under these circumstances, the close lever is decoupled from primary hook 104, and thus the capability to manually initiate closure of the breaker by the close pushbutton is defeated. Yet, the mechanism springs can be charged and, in fact, prop 54 (FIG. 3) is available to store a charge in charging spring 46. Thus, the breaker stands ready to be closed once the interlock is removed, i.e., trip lever 82 is restored to its counterclockwise-most position by return spring 84.

Figure 11:
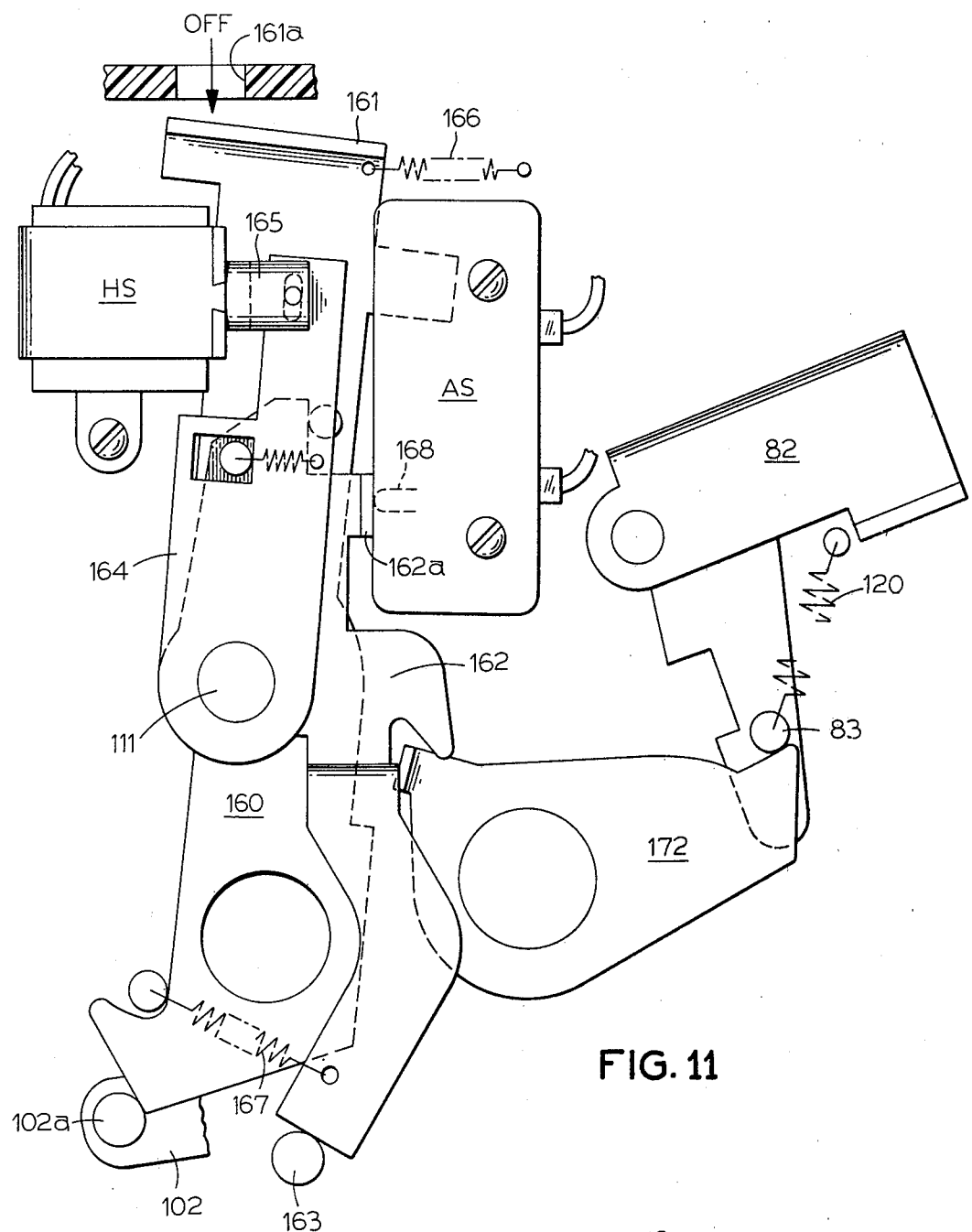
FIG. 11 is a side elevational view of apparatus for controlling closing solenoid actuation of the hook apparatus of FIG. 5.
Figure 14:
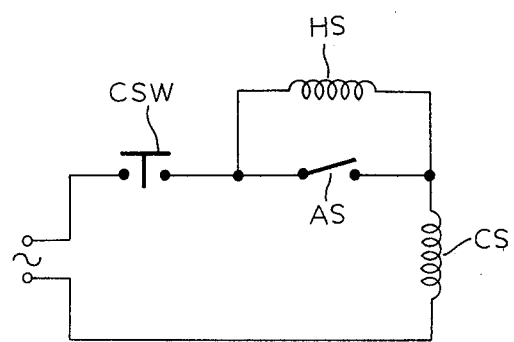
FIG. 14 is a wiring diagram of the closing solenoid energization circuit.

FIGS. 11 through 14 disclose apparatus for controlling remote closure of the circuit breaker utilizing a closing solenoid shown in the circuit diagram of FIG. 14 at CS. This closing solenoid is wired in a series energization circuit with an arming switch AS and a pushbutton closing switch CSW. A holding solenoid HS is connected in shunt with the arming switch. As seen in FIG. 11, a circuit breaker ON/OFF indicator arm 160, an arming switch actuating lever 162, and an anti-closure lever 164 are commonly pivotally mounted on a pin 111 which, in FIG. 5, was also seen to pivotally mount manual close lever 110. As will be seen, roller pin 102a of intermediate hook 102 (FIGS. 12 and 13) acts on the lower end of indicator arm 160 such as to controllably position a display panel 161 carried at the upper end thereof to register the word OFF in a window 161a of the breaker cover when the breaker contacts are open and the word ON when the breaker contacts are closed. A pin 163, seen in FIG. 5 to be carried by hook cam 100 mounted by the center pole movable contact assembly 28, acts on the lower end of switch actuating arm 162 to control actuation of arming switch AS depending upon whether the movable contact assemblies are in their tripped open, hooked open or closed positions. As will be seen, also controlling switch actuating arm 162 are indicator arm 160 and lever 164 whose upper end is pinned to the plunger 165 of holding solenoid HS.

FIG. 11 illustrates the positions of the various parts assumed when the movable contact assemblies are in their hooked open position, ready for closure. The latched position of intermediate hook roller pin 102a, where it engages hook cam 100 to sustain the hooked open position of the movable contact assemblies, also establishes a clockwise-most position of indicator arm 160 assumed under the bias of tension spring 166. This indicator arm position registers the word OFF borne by display panel 161 in the cover window 161a. The trip cam mounted pin 163 assumes a position permitting a tension spring 167 to bias switch actuating arm 162 in the clockwise direction, thereby swinging a laterally turned tab 162a thereof into depressing engagement with an actuating button 168 of normally open arming switch AS. The arming switch is thus held closed to arm the energization circuit for closing solenoid CS, as seen in FIG. 14.

When close pushbutton switch CSW is depressed to complete the closing solenoid energization circuit, the closing solenoid CS is activated, swinging primary hook 104 in the clockwise direction, as seen in FIG. 6, and the movable contact assemblies are freed to spring to their closed position. As was described, with closure movement of the movable contact assemblies, the trailing edge of hook cam 100 engages roller pin 102a to cam intermediate hook 102 in the clockwise direction. Roller pin 102a is thus swung upwardly from its phantom line position to its solid line position of FIG. 12, in the process camming indicator arm 160 in the counterclockwise direction against the bias of spring 166 to a position where the word ON borne by display panel 161 is registered in the cover window.

Figure 12:
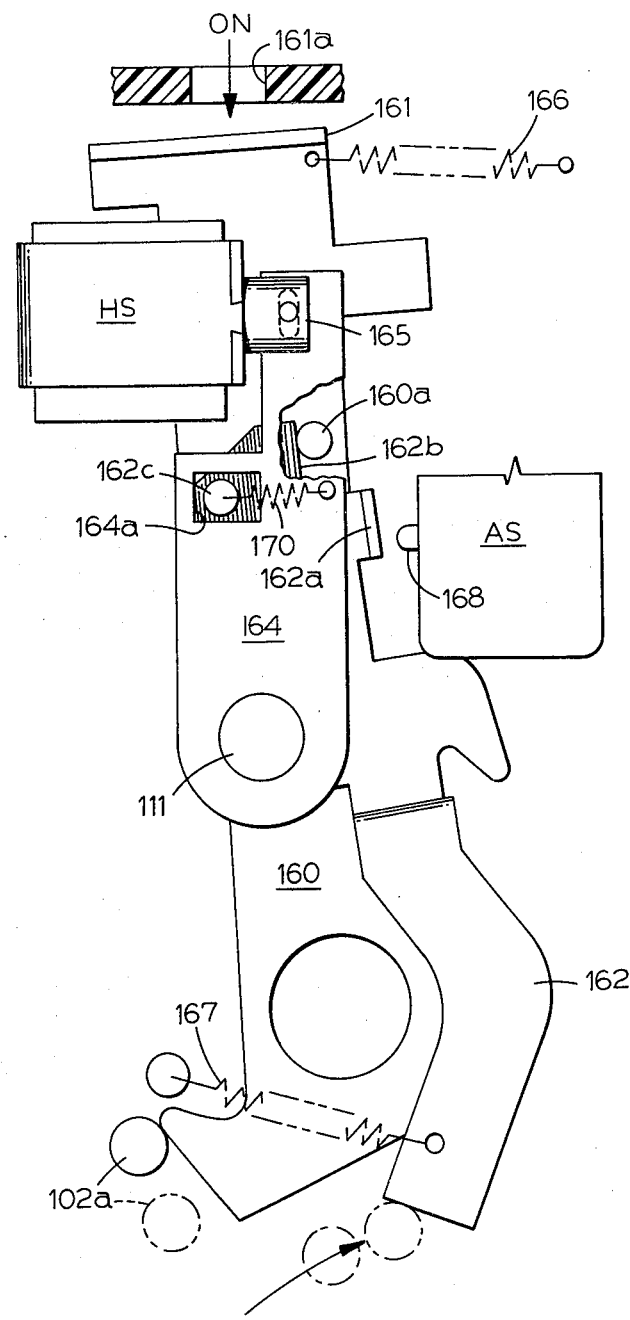
FIG. 12 is a side elevational view of the control apparatus of FIG. 11 seen in its condition while the breaker contacts are closed.

Also with the closure of the movable contact assemblies, pin 163, carried by hook cam 100 is swung from its phantom line position to its solid line position of FIG. 12 in displaced relation to the lower end of switch actuating arm 162. As the indicator arm is pivoted counterclockwise to its ON indicating position by roller pin 102a, a pin 160a carried by the indicator arm picks up a shoulder 162b at the upper end of the switch actuating arm, pivoting the latter in the counterclockwise direction against the bias of spring 167. Tab 162a thus releases actuating button 168, and arming switch AS opens to break the direct electrical connection of the closing solenoid with the AC source through closing switch CSW (FIG. 14). Thus the closing solenoid is automatically dropped out incident to closure of the breaker contacts and without regard to the duration of closure of pushbutton switch CSW. Consequently, the closing solenoid can safely be designed for very limited duty.

Still referring to FIG. 12, switch actuating arm 162 carries, adjacent its upper end, a pin 162c which projects laterally through an opening 164a in lever 164. A tension spring 170 is hooked between this pin and the anti-closure lever. It is thus seen that when the switch actuating arm is pivoted counterclockwise by the indicator arm incident with closure of the breaker, spring 170 pulls lever 164 counterclockwise to firmly seat plunger 165 of holding solenoid HS, which conveniently may take the form of a conventional undervoltage release solenoid. From FIG. 14 it is seen that when the arming switch is opened incident with closure of the breaker, holding solenoid HC is energized in series with closing solenoid CS, as long as closing switch CSW is held depressed. The magnitude of the energization current drawn through the holding solenoid develops sufficient magnetic attraction to maintain its plunger seated against the bias of spring 167, should the circuit breaker be tripped open while close pushbutton switch CSW is held depressed. This energization current drawn through the closing solenoid is however insufficient to effect its actuation and is of such a low level as not to harm the closing solenoid even if persistent. The significance of this arrangement will be described below.

Figure 13:
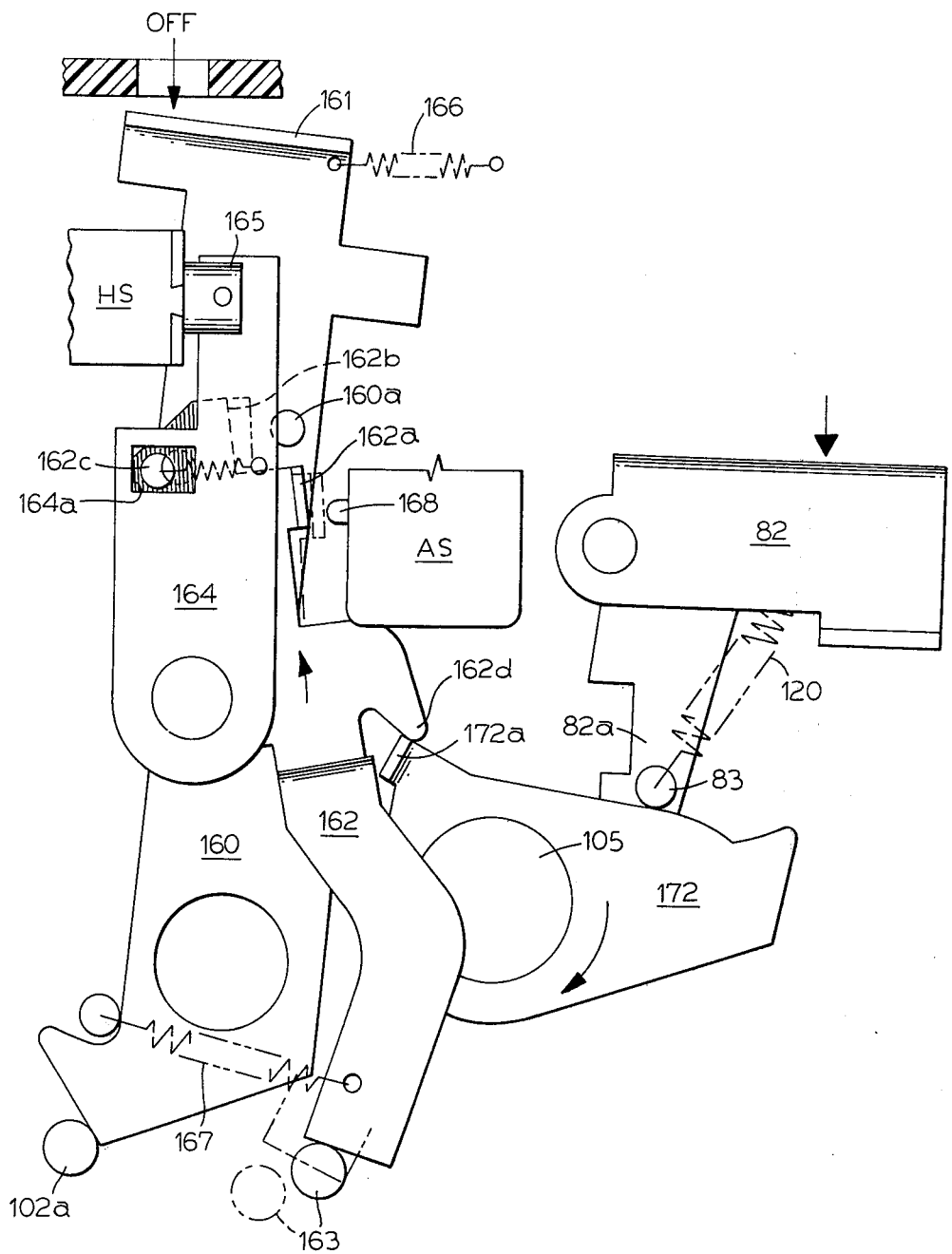
FIG. 13 is a side elevational view of the control apparatus of FIG. 11 seen in its condition inhibiting closing solenoid actuation of the hook apparatus of FIG. 5.

FIG. 13 shows pin 163 in its solid line position assumed when the movable contact assemblies are in their tripped open position. In this position it engages the lower end of switch actuating arm 162 to take over the responsibility of holding the switch actuating arm in its counterclockwise-most switch de-actuating position as indicator arm 160 is released by intermediate hook roller pin 102a and swung clockwise by spring 166 to its OFF indicating position. When mechanism springs 32 (FIG. 1) are charged, the movable contact assemblies spring to their hooked open position, with pin 163 moving from its solid line position to its phantom line position of FIG. 13. If close pushbutton switch CSW remains depressed to sustain energization of holding solenoid HS, its plunger 165 is held seated to prevent clockwise pivotal movement of anti-closure level 164. When pin 163 releases switch actuating arm from its position of FIG. 13, spring 167 attempts to pivot this arm clockwise into depressing switch actuating engagement with arming switch button 168, but this motion is arrested short of the mark by the engagement of pin 162c with the right edge of opening 164a in lever 164. Thus, unlike the situation depicted in FIG. 11, switch AS is not closed to arm the closing solenoid when the movable contact assemblies move to their hooked open position, if the closing pushbutton switch CSW remains depressed. This construction prevents closure of the breaker back into a fault from which it has just been tripped open because of inadvertent prolonged depression of the closing switch. It is thus seen that the holding solenoid anti-closure lever combination serves the same purpose with respect to electrical closure of the breaker as does by-pass lever 114 (FIGS. 7 and 8) with respect to manual closure of the breaker. When the closing switch is released, energization of the holding solenoid is interrupted, and spring 167 propels the switch actuating arm into closure actuating engagement with button 168 of arming switch AS. The parts are back in their positions seen in FIG. 11 to await reclosure of close pushbutton switch CSW which is now effective in precipitating closure of the circuit breaker. It is thus seen that each close switch closure is effective to precipitate but one closure of the circuit breaker.

As in the case of previously described manual closing facility the just described electrical closing facility should be capable of accommodating interlocking provisions required by certain accessories such as Kirk Key interlocks, padlocking interlocks, and drawout interlocks. As was described in connection with FIG. 10, in the case of the subject circuit breaker, these trip interlocks are imposed by sustained depression of trip lever 82. It will be recalled that such trip lever depression cams by-pass lever 114 in the clockwise pivotal direction to effectively decouple closing lever 110 from primary hook 104. Thus, depression of manual close pushbutton 116 (FIGS. 7 and 8) cannot precipitate breaker closure. FIG. 13 shows trip lever 82 held in its clockwise-most depressed position as imposed by such an interlock accessory. It is seen that pin 83 carried by the leg 82a of trip lever 82, in addition to pivoting bypass lever 114 to its clockwise, manual closure defeating position (FIG. 10), also swings into engagement with the upper edge of an electrical closure bypass lever 172 pivotally mounted on hub 105 carried by the mechanism frame. This engagement cams this bypass lever in the clockwise direction to swing a laterally turned tab 172a thereof generally upwardly. This tab picks up a nosed portion 162d of the switch actuating lever 162, pivoting the latter counterclockwise to its arming switch deactuating position where it is held as long as the trip lever is maintained depressed. Under these circumstances, closure of the arming switch is precluded, and thus the capability of close pushbutton switch CWS to precipitate closure of the breaker is defeated.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. Apparatus for controlling the closure of a circuit breaker initiated by the action of a closing solenoid, said apparatus comprising, in combination:
  A. a normally open breaker closure initiating switch;
  B. a normally open arming switch connected in series with said closure switch, the closing solenoid and a source of electric current;
  C. a holding solenoid electrically connected in shunt with said arming switch and having a plunger movable between a seated position and an extended position;
  D. hook means for holding the breaker movable contacts in a hooked open position against the force of a charged breaker operating mechanism spring acting to drive the movable contacts to a closed position, the closing solenoid being operatively coupled with said hook means such that electrical energization thereof activates said hook means to release the movable contacts from their hooked open position;
  E. a first member mounted for movement between an OFF position assumed in response to the movable contacts being in either their tripped open position, assumed when the mechanism spring is discharged, or their hooked open position and an ON position assumed in response to the movable contacts being in their closed position;
  F. an arming switch actuating member mounted for movement between a switch actuating position and a switch deactuating position, said switch actuating member assuming its deactuating position in response to the movable contacts being in their tripped open position and in response to said first member being in its ON position, and said switch actuating member assuming its actuating position to close said arming switch in response to said movable contacts being in their hooked open position, p2 (1) whereby, with said switch actuating member in its actuating position, closure of said breaker closure initiating switch completes an energization circuit for the closing solenoid through said arming switch to activate said hook means and thus release the movable contacts from their hooked open positions; and
  G. a second member pinned to said holding solenoid plunger and movable between a first position effective to dispose said plunger in its seated position and a second position effective to dispose said plunger in its extended position, said switch actuating member acting to position said second member to its first position as it assumes its switch deactuating position, and said second member acting on said switch actuating member to hold it away from its switch actuating position while said solenoid is energized to magnetically hold said plunger in its seated position by virtue of sustained closure of said breaker closure initiating switch,
  G. (continued)
    (1) whereby to preclude multiple activations of said hook means by the closing solenoid due to sustained closure of said breaker closure initiating switch.

2. The apparatus defined in claim 1, wherein said first member is positioned in its OFF and ON positions under the control of said hook means.

3. The apparatus defined in claim 1, which further includes a first spring effective to bias said switch activating member to its switch actuating position while said movable contacts are in their hooked open position and said second member is in its second position.

4. The apparatus defined in claim 1, wherein said first member carries a display panel bearing indicia registerable with a window in the breaker cover to indicate whether the breaker movable contacts are in their closed position or either their hooked open or tripped open positions.

5. The apparatus defined in claim 3, which further includes a closure defeat member operable in response to an externally imposed interlock function to engageably hold said switch actuating member in its switch deactuating position against the bias of said first spring despite said movable contacts being in their hooked open position and said second member being in its second position.

6. The apparatus defined in claim 3, which further includes a second spring biasing said first member to its OFF position while the movable contacts are in their tripped open and hooked open positions.

7. The apparatus defined in claim 6, wherein said switch actuating member and said second member are interactively coupled by a spring biased, lost motion coupling.

8. The apparatus defined in claim 7, wherein said lost motion coupling includes a pin mounted by said switch actuating member and received in an opening in said second member, said opening being elongated in the direction of movement of said switch actuating member between its switch actuating and switch deactuating positions, and a third spring acting between said switch actuating member and said second member to bias said pin against the end of said slot facing the direction of movement of said switch actuating member toward its switch actuating position, whereby said third spring resilient urges said second member to its first position as said switch actuating member assumes its switch deactuating position and said pin abuts said slot end to hold said switch actuating member away from its switch actuating position while said holding solenoid is energized to magnetically hold said plunger in its seated position and thus detain said second member in its first position.

9. The apparatus defined in claim 8, wherein said first member carries a display panel bearing indicia registerable with a window in the breaker cover to indicate whether the breaker movable contacts are in their closed position or either their hooked open or tripped open positions.

10. The apparatus defined in claim 8, which further includes a closure defeat member operable in response to an external imposed interlock function to engageably hold said switch actuating member in its switch deactuating position against the bias of said first spring despite said movable contacts being in their hooked open position and said second member being in its second position.

* * * * *